United States Patent Office 3,575,855
Patented Apr. 20, 1971

3,575,855
DRILLING FLUID SYSTEM
Jack C. Estes, Tulsa, Okla., assignor to Pan American
Petroleum Corporation, Tulsa, Okla.
No Drawing. Filed May 1, 1968, Ser. No. 725,947
Int. Cl. C10m 3/34, 3/30
U.S. Cl. 252—8.5     10 Claims

ABSTRACT OF THE DISCLOSURE

Drilling muds containing anti-differential sticking agents which employ surface active agents as their principal active ingredient are often subject to excessive foaming. The invention covered in this patent renders drilling muds highly resistant to foam formation by the addition of an alkylolamide to the anti-differential sticking agent. In addition to the surface active agent, the anti-differential sticking composition contains a water soluble phosphate, a glycol and a $C_2$ or $C_3$ alcohol, all dissolved in water.

---

The present invention relates to new and improved compositions useful in preventing drill pipe from becoming stuck during drilling operations or for freeing drill pipe when it sticks to the wall of a well by means of differential pressure. More particularly, it is concerned with compositions useful for the above mentioned purposes which are also resistant to foaming.

BACKGROUND OF THE INVENTION

Frequently, in drilling operations, particularly at depths in excess of 8,000 feet, the drill pipe becomes stuck and cannot be rotated or removed from the hole. In any hole where the mud pressure is substantially higher than the formation fluid pressure, a mud cake forms opposite the permeable section of the hole and a flow of filtrate passes through the mud cake and into the formation, thus thickening the mud. It has been previously observed that a pressure differential from the well bore to a permeable formation covered with mud cake can hold the pipe next to the well bore wall with great force. This occurs when a portion of the pipe rests against the wall of the well, embedding itself in the filter cake. The area of the drill pipe in contact with the cake is thus sealed off from the full hydrostatic pressure of the mud column. The pressure difference between the mud column pressure and the formation pressure acts on the area of drill pipe in contact with the mud cake to hold the pipe against the wall of the hole. The degree to which this phenomenon occurs depends on a number of factors, such as mud weight, the permeability of the formation, the area of contact of the pipe with the mud cake, fluid loss properties of the mud, the time that the pipe remains in contact with the thickened filter cake, etc.

In U.S. Patent 3,223,622 a number of anti-differential sticking agents are described. I have found, however, that such agents, while effective to reduce differential sticking, tend to foam and to degrade the mud system in which they are used because of the pronounced tendency in most cases for the oil present to wet the barite in the mud causing the former to flocculate and settle in the well bore. In the mud pit, barite, and sometimes bentonite as well, becomes oil wet and settles out causing the mud system to become unbalanced and ineffective. This difficulty has been found to exist particularly in the case where the anti-differential sticking agent is a complex amine sulfonate of the type defined hereinafter. Oil wetting of the barite in drilling mud offsets the normal tendency for barite to be supported or suspended by its attraction for other water wet particles in the mud such as bentonite and clays. When the barite becomes oil-wet the individual particles thereof lose their supporting action, and being heavier than the other components of the system, tend to settle out.

In copending application Ser. No. 546,211, filed Apr. 29, 1966 by Jack C. Estes and Arthur Park, now Patent No. 3,472,768, anti-differential sticking compositions are described and claimed which are effective in preventing drill pipe from becoming wall stuck or in freeing such pipe after it has become stuck to the well wall as a result of differential pressure. These compositions—which contain water soluble inorganic phosphates in addition to the complex amine sulfonates claimed in U.S. 3,223,622—effectively function to prevent oil wetting of the barite under conditions of field use. However, oftentimes when they are incorporated into drilling fluids they are found to be present in concentrations such that excessive foaming occurs, particularly in the case of non-dispersed muds, thus lowering the hydraulic head of the mud column and increasing the danger of a blowout. It should be pointed out, however, that the compositions disclosed in the above-mentioned application while capable of being used under conditions such that foaming does not occur, the concentration of these agents in the drilling fluid is difficult to control within the relatively narrow limits over which foaming is found to be suppressed.

In addition to the foregoing disadvantages, the above mentioned compositions have the further drawback that they cloud up at about $-20°$ F. becoming unstable and at about $-35°$ F. they freeze and hence are unsuitable for use in such areas as Canada and Alaska in winter time when a major part of oil well drilling operations are carried out.

DESCRIPTION OF THE INVENTION

I have now discovered that the use of certain oil soluble alkylolamides in combination with the anti-differential sticking agents described and claimed in the aforesaid application Ser. No. 546,211 provides compositions capable of rendering drilling muds highly resistant to foam formation over relatively wide concentration ranges in these muds and under conditions of normal use. The basic components of the anti-differential sticking agents described in said Ser. No. 546,211 are water soluble inorganic phosphates and complex amine sulfonates. The phosphates employed in my invention cannot be combined directly with the complex amine sulfonate or with the alkylolamides because the phosphates are not soluble in either of them. It is, therefore, desirable to prepare an aqueous solution of the phosphate in order to combine it with the sulfonate, which is ordinarily dissolved in isopropyl alcohol. There is a maximum amount of phosphate for a given ratio of water to sulfonate solution that can be combined in this manner to give a clear solution. The addition of ethylene glycol, propylene glycol or similar compounds serves as a means for coupling or blending the phosphate and amine sulfonate and increases the maximum amount of phosphate that can be combined with a given water to sulfonate ratio. Along with the glycol I may add one of the lower molecular weight alcohols, i.e, $C_2$–$C_3$ alcohols, preferably isopropyl or n-propyl alcohol containing from about 15 to 20% water. The alcohol and the glycol serve to solubilize the amine sulfonate and the subsequently added alklolamide while the water aids in keeping the phosphate in solution. Oddly enough, I have found that methanol or mixtures of methanol and isopropyl alcohol are unsatisfactory since the phosphates seem to be substantially insoluble causing such systems to become unstable.

In preparing the foam resistant compositions of my invention an aqueous solution of the phosphate is first preferably prepared and then to this solution are added the glycol and alcohol. After these components have been thoroughly mixed the amine sulfonate is stirred in, followed by addition of the alkylolamide.

The complex amine sulfonate referred to above is prepared from about 4 parts of a half ammonium, half isopropylamine salt of the sulfosuccinic acid ester of the oleic acid amide of isopropanol amine and about one part of the isopropylamine salt of dodecyl benzene sulfonic acid. Further particulars on the preparation of this composition are disclosed in U.S. 2,976,209. For convenience this compound is hereinafter referred to as a "complex amine sulfonate." This material is generally used in the form of a propyl alcohol solution wherein the active ingredients range in concentration from about 50 to about 80 weight percent.

Although the inorganic water soluble phosphates in general have been found to prevent the oil wetting of barite in drilling muds, the preferred group of phosphates used in the preparation of the composition of my invention is limited to the potassium and sodium phosphates such as monosodium phosphate, disodium phosphate, potassium tripoly phosphate, etc. While standard phosphate mud thinners, such as sodium acid pyrophosphate and sodium hexametaphosphate, also function to prevent undesirable oil-wetting of the barite, precautions should be taken in the use of such materials because the gel strength of the mud can be lowered to the extent that barite can settle. In this connection the term "water-soluble inorganic phosphate," as used in the present claims, is intended to be restricted to phosphates of the types mentioned in this paragraph.

The alkylolamides employed in preparing the foam resistant anti-differential sticking agents of my invention are prepared from fatty acids having from 8 to 22 carbon atoms and an alkylolamine such as monoethylol amine, diethylol amine, monoisopropanol amine, diisopropanol amine, or the like. Typical examples of acids suitable for preparing the alkylolamides employed in the compositions of my invention are caprylic, lauric, myristic, palmitic, oleic, stearic and the like.

The fatty acid is reacted with the alkylolamine in a ratio of 1 mol of the acid to 1 or 2 mols of the amine. Typical reaction temperatures range from about 210° to about 400° F. with or without vacuum or the presence of inert gas. Generally, the fatty acid employed is preferably an 18 carbon atom acid, e.g. oleic acid, while the alkylolamine may be any of the group indicated above.

The alkylolamides employed in preparing the composition of my invention are illustrated by the following structural formula:

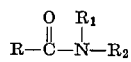

in which the substituent R is an aliphatic group having from 7 to 21 carbon atoms, $R_1$ may be either hydrogen or a hydroxyalkyl group of from 2 to 3 carbon atoms, and $R_2$ is a hydroxyalkyl group of from 2 to 3 carbon atoms.

Typical properties of the alkylolamide formed from oleic acid and diethanolamine are as follows:

| | |
|---|---|
| Appearance | Amber liquid. |
| pH | 8.6 (3% dispersion in 1:1 isopropyl alcohol-water. |
| Specific gravity at 25°/4° C. | 0.96. |
| Acid No. | 2.5. |
| Moisture percent | 0.15. |

Alkylolamides contemplated herein possess properties similar to those listed above.

Compositions of the general class contemplated herein which contain excessive amounts of phosphate have less tendency for oil wetting but also have less anti-differential sticking activity because of a lower percentage amount of the complex amine sulfonate being present. However, when excessive concentrations of phosphate are present the system becomes cloudy and unstable. On standing the mixture separates into two layers and is ineffective. Ordinarily, I prefer to employ pohsphate concentrations in the compositions of my invention ranging from about 10 to about 18 weight percent, depending of course on the amount of glycol and/or alcohol present. The use of these glycols and alcohols in the preferred compositions not only permits a higher concentration of phosphate to go into solution in the additive, but also functions to stabilize the system by preventing the organic compounds thereof from coming out in a separate phase when mixed with the phosphate solution. The compositions of my invention are clear, light, straw-colored, homogeneous liquids, stable over a wide range of temperatures for indefinite storage periods. In this connection it should be strictly understood that the compositions contemplated herein should be essentially clear solutions. As previously indicated mixtures that are cloudy are unstable and lead to unsatisfactory results.

In connection with the concentrations of the different ingredients used in preparing the improved anti-differential sticking agents of my invention, it is to be stressed that such concentrations may vary within relatively wide ranges. The limiting factor, however, is that such compositions should be essentially clear systems. This means that at all times there should be enough solvent, i.e., water and/or glycol, to maintain the phosphate in solution and enough glycol and/or alcohol to keep the complex amine sulfonate and alkylolamide dissolved. Typical concentrations of the components generally used in the aforesaid compositions are from about 40 to about 60 percent complex amine sulfonate, 5 to about 10 percent alkylolamide, 5 to about 15 percent glycol, 0 to about 20 percent alcohol[1], 10 to about 18 percent water soluble phosphate, and from about 20 to about 40 percent water. Where freezing of the additive of my invention is no problem, the alcohol, if desired, may be present only in an amount necessary to make a solution of the complex amine sulfonate, for example, about 20 percent alcohol.

The additive of my invention may be employed in amounts ranging from about 0.125 to about 10 lbs. per barrel of mud, depending on the amount of solids in the mud; the usual concentration is about 1 to about 5 lbs. per barrel. The additive may be used in concentrations greater than stated; however, no appreciable benefit is generally produced by the presence of amounts over that needed to coat the mud solids.

A typical formula I have found well suited to field operations has the following composition:

| | Percent |
|---|---|
| Water | 22 |
| Monosodium phosphate, monohydrate | 9 |
| Ethylene glycol | 14 |
| Complex amine sulfonate | 42 |
| Alkylolamide prepared from oleic acid and monoethylolamine | 8 |
| Isopropanol azeotrope (12.1% water) | 5 |

All percentages are by weight.

The ethylene glycol and isopropyl alcohol present not only are helpful to maintain a maximum phosphate concentration in the system and to prevent the aforesaid complex and alkylolamide from forming a separate phase, but the pore and freezing points of such composition are lowered to −40° F. and −65° F., respectively.

In a further test of the ability of the composition of my invention to control foam in drilling muds I prepared an aqueous slurry of 3 weight percent bentonite and 3 weight percent low yield clay to which had been added two volume percent diesel oil. To this system an additive such as that shown in the above mentioned formula, with the alkylolamide and isopropyl alcohol removed, was

---

[1] Amount over and above that required to maintain the complex amine sulfonate in solution.

mixed into the drilling fluid in a concentration of .5 lb./bbl. A 350 milliliter sample of this fluid containing the aforesaid formula when stirred on a Hamilton Beach mixer caused the entire volume of the fluid to foam out of a 1 liter container. On the other hand, when the above mentioned formula which contained the alkylolamide, was added to a second test sample of equal volume and in the same concentration, there was produced only 1 inch of foam on top of the mud under identical conditions.

The compositions of my invention in addition to possessing antidifferential sticking properties and lubricity characteristics comparable to those described and claimed in the aforesaid co-pending application Ser. No. 546,211, exhibit improved pour point and freezing point properties as well as improved resistance to foaming. Since the use of compositions of the type contemplated herein is highly desirable in drilling fluid systems employed in the Far North, these favorable low temperature characteristics make them readily adaptable to the severe sub zero conditions encountered in these areas. This points up a further unique characteristic of the alkylolamides used in the composition of my invention since the defoamer employed must be one which not only inhibits foam formation but one which does not materially increase the pour point and freezing point of these compositions.

I claim:
1. A foam resistant drilling fluid additive for prevention of oil wetting of barite present in said fluid comprising essentially an aqueous solution of a water soluble inorganic phosphate selected from the group consisting of monosodium phosphate, disodium phosphate, potassium tripoly phosphate and sodium acid pyrophosphate wherein said phosphate is present in an amount ranging from about 10 to about 18 weight percent, and from about 40 to about 60 weight percent of a surface active agent prepared from about 4 parts of a half ammonium half isopropylamine salt of the sulfosuccinic acid ester of the oleic acid amide of isopropanol amine and about 1 part of the isopropylamine salt of dodecyl benzene sulfonic acid, from about 5 to 10 weight percent of a fatty alkylolamide having the structural formula

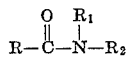

wherein R represents the residue of a fatty acid wherein said residue has from 7 to 21 carbon atoms, $R_1$ is a member selected from the group consisting of hydrogen and a hydroxyalkyl group of from 2 to 3 carbon atoms, and $R_2$ represents a hydroxyalkyl group of from 2 to 3 carbon atoms and a minor amount of a water miscible glycol selected from the group consisting of ethylene glycol and propylene glycol together with enough $C_2$ to $C_3$ monohydric alcohol to give a substantially clear solution.

2. The additive of claim 1 wherein said surface active agent is employed in the form of a 60 to 80 weight percent solution in a $C_3$ alcohol.

3. The additive of claim 2 wherein the alkylolamide is employed in a concentration of from about 5 to about 10 weight percent.

4. The additive of claim 1 in which the water miscible glycol is ethylene glycol.

5. The additive of claim 2 wherein the phosphate is employed in an amount corresponding from about 10 to about 20 weight percent.

6. The additive of claim 2 wherein isopropyl alcohol is the alcohol employed and is present in said additive in an amount not more than about 40 weight percent based on the weight of said surface active agent.

7. The additive of claim 3 wherein the alkylolamide is prepared from oleic acid and diethanolamine.

8. The additive of claim 5 wherein the phosphate is monosodium phosphate.

9. The additive of claim 1 wherein a sufficient amount of a $C_2$ to $C_3$ alcohol is added to depress the freezing point of said additive to a value of not lower than about −65° F.

10. An aqueous drilling fluid containing barite and a dispersed oil having incorporated therein the additive of claim 1 in a concentration of from about 0.125 to about 10 lbs. per barrel of said drilling fluid.

References Cited
UNITED STATES PATENTS

| | | | |
|---|---|---|---|
| 1,892,857 | 1/1933 | Spellmeyer | 252—321X |
| 2,349,585 | 5/1944 | Bond et al. | 252—8.5 |
| 2,366,727 | 1/1945 | Gunderson | 252—321X |
| 3,223,622 | 12/1965 | Lummus et al. | 252—8.5 |
| 3,472,768 | 10/1969 | Estes et al. | 252—8.5 |

HERBERT B. GUYNN, Primary Examiner

U.S. Cl. X.R.

252—358